(12) United States Patent
Wright et al.

(10) Patent No.: US 7,377,733 B2
(45) Date of Patent: May 27, 2008

(54) UNIVERSAL APPARATUS FOR THE INSPECTION, TRANSPORTATION, AND STORAGE OF LARGE SHELL STRUCTURES

(75) Inventors: Daniel J. Wright, Mercer Island, WA (US); Gary E. Georgeson, Federal Way, WA (US); Michael D. Fogarty, Auburn, WA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 11/161,735

(22) Filed: Aug. 15, 2005

(65) Prior Publication Data

US 2007/0036627 A1  Feb. 15, 2007

(51) Int. Cl.
*B60P 7/08* (2006.01)

(52) U.S. Cl. ............................ 410/49; 410/44; 410/45; 410/46; 410/47; 410/53; 280/47.35

(58) Field of Classification Search ............ 410/34–35, 410/44–47, 49–50, 53–54, 80, 94; 211/81, 211/85.18, 162, 170, 171; 280/30, 47.35, 280/35, 763.1; 414/477, 911; 108/54.1, 108/55.1, 55.3, 5, 57.15
See application file for complete search history.

(56) References Cited

U.S. PATENT DOCUMENTS

| | | | | |
|---|---|---|---|---|
| 2,828,931 | A | * | 4/1958 | Harvey ........................ 410/46 |
| 4,270,741 | A | * | 6/1981 | Hurst |
| 4,684,113 | A | | 8/1987 | Douglas et al. |
| 5,249,785 | A | | 10/1993 | Nelson et al. |
| 5,364,083 | A | | 11/1994 | Ross et al. |
| 5,879,014 | A | * | 3/1999 | Price |
| 2005/0135895 | A1 | * | 6/2005 | Valentine ..................... 410/50 |

OTHER PUBLICATIONS

United States Statutory Invention Registration US H2061 H.

\* cited by examiner

*Primary Examiner*—Stephen Gordon
(74) *Attorney, Agent, or Firm*—Ostrager Chong Flaherty & Broitman P.C.

(57) ABSTRACT

An apparatus for holding an aerospace structure, having an edge and a surface, includes a base. Coupled to the base is an edge support adapted to releasably engage the edge of the structure. Also coupled to the base is a stanchion. Moveably coupled to the stanchion is a surface support adapted to support the surface of the structure when the edge of the structure is retained by the edge support.

11 Claims, 6 Drawing Sheets

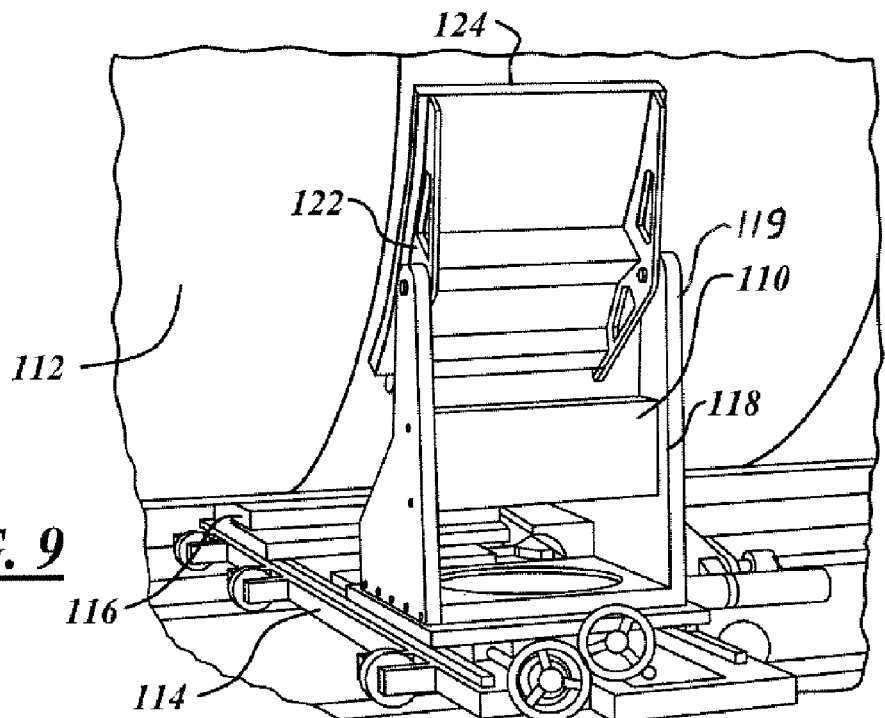
FIG. 9
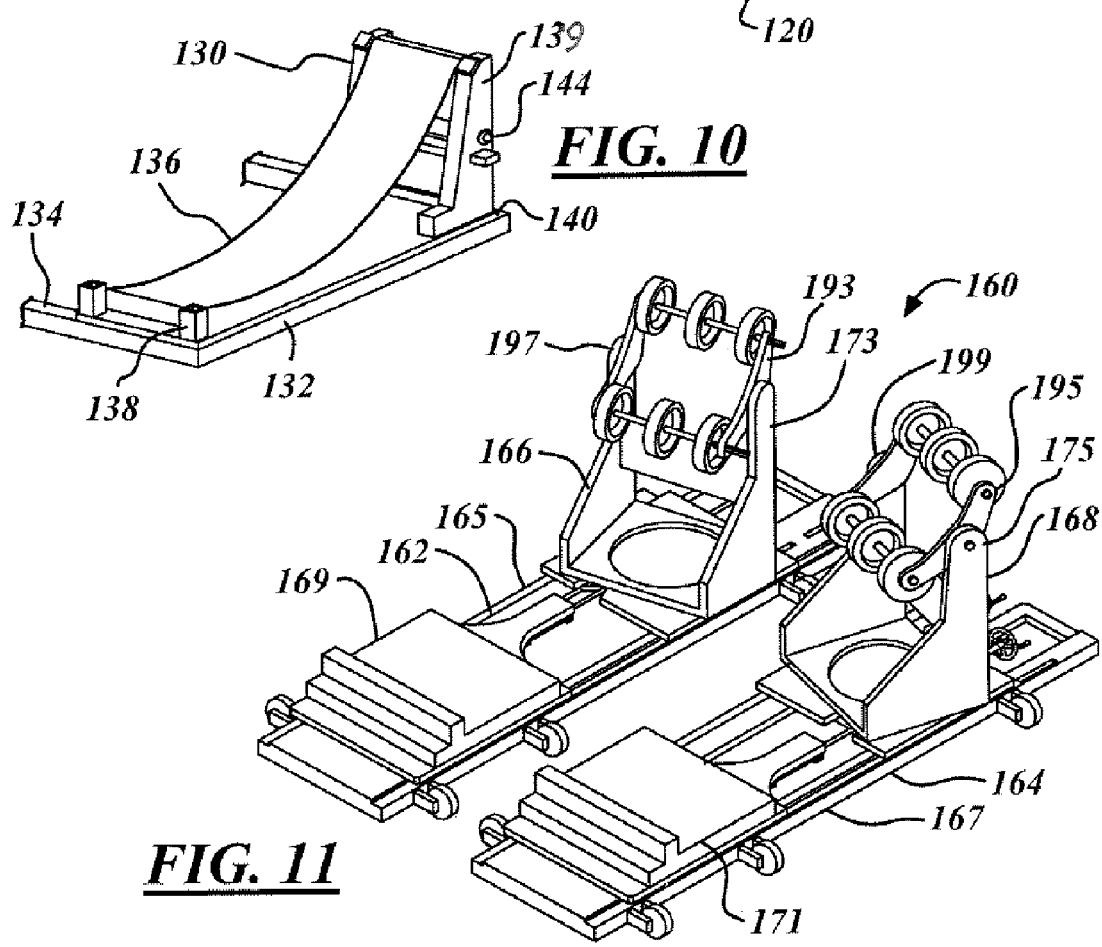
FIG. 10
FIG. 11

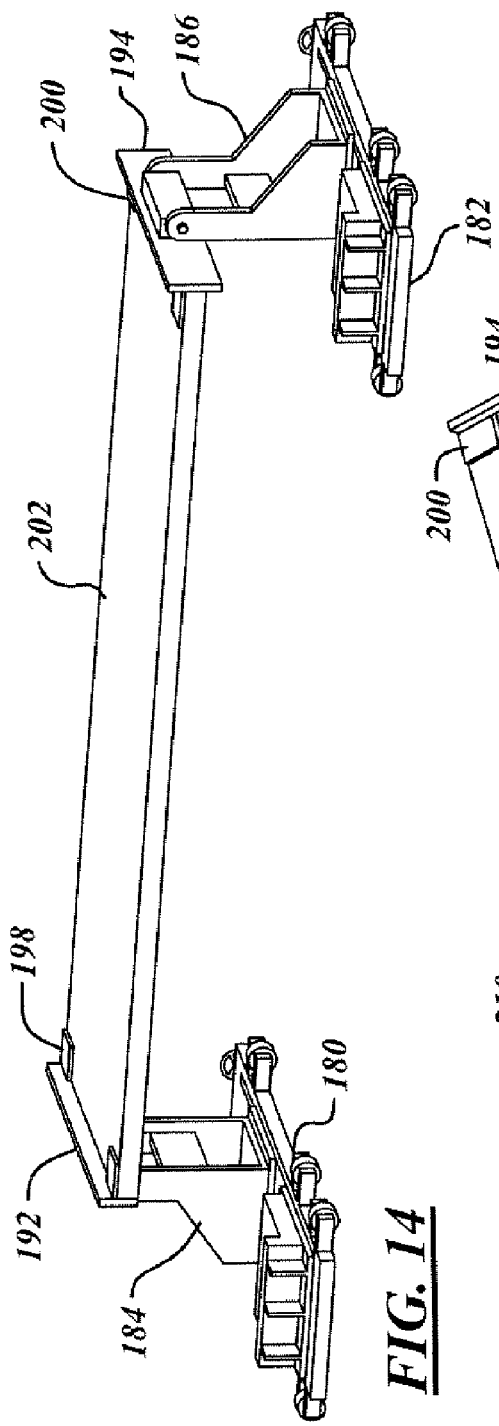
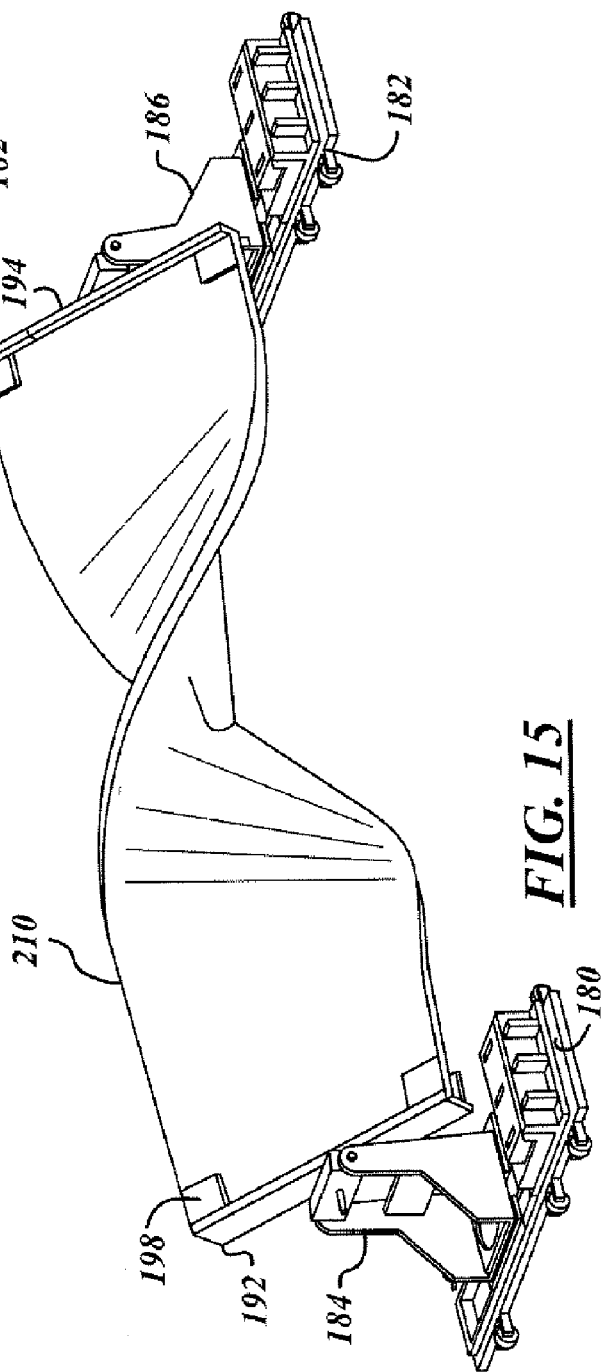

UNIVERSAL APPARATUS FOR THE INSPECTION, TRANSPORTATION, AND STORAGE OF LARGE SHELL STRUCTURES

TECHNICAL FIELD

The present invention relates generally to holding apparatuses and, more particularly, to a universal apparatus for inspection, transportation, and storage of large shell structures.

BACKGROUND OF THE INVENTION

There is a constant need for versatile holding apparatuses requiring a minimum amount of moving around of parts for inspection. Many companies, such those in the aircraft industry, have precious little room for inspection, transportation, and storage of large shell structures or parts. Further, large parts must be held in orientations allowing them to be inspected while not interfering with data collection.

A variety of large holding apparatuses, such as base support, base-only, and framed apparatuses, have been designed to hold various parts. However, Base support type apparatuses generally cannot hold parts in orientations required for through-transmission ultrasonic testing (with a scanning head on both sides of the part). Further, base-only type apparatuses (where part sits on a base) are limited for holding parts in proper orientations for inspection. Base-only apparatuses also cannot hold extremely large parts so that they fit in some scanners. Still further, framed apparatus designs are generally heavy structures that often extremely difficult to move. This may be problematic because parts must be moved for scanning and maintenance. It is also expensive to build a framed structure that is stiff enough for holding airplane parts.

Current apparatuses are typically not universal, and one apparatus will generally only work for one particular part. So, additional apparatuses are built, at much greater cost. Efforts to universalize framed tooling have generally produced even more complicated and expensive apparatuses.

There exists, therefore, a need for relatively light and inexpensive universal holding apparatuses. Further, there exists a need for mobile holding apparatuses for building, using, storing, and maintaining airplane parts.

SUMMARY OF THE INVENTION

In accordance with one embodiment of the present invention, an apparatus for holding an aerospace structure, having an edge and a surface, includes a base. Coupled to the base is an edge support adapted to releasably engage the edge of the structure. Also coupled to the base is a stanchion. Moveably coupled to the stanchion is a surface support adapted to support the surface of the structure when the edge of the structure is retained by the edge support.

In accordance with another embodiment of the present invention, an apparatus for holding includes a base having a plurality of wheels coupled thereto. Mounted thereon is an edge support and a stanchion such that a part may be held by the edge support and the stanchion. The base includes a top, a bottom, a common edge, a stanchion side of the top, a middle portion of the top, and an edge support side of the top. Coupled to the common edge are the plurality of wheels. Coupled to the edge support side is the edge support, and coupled to the stanchion side is the stanchion. At least one of the stanchion or the edge support moves on tracks on the top such that the edge support and the stanchion are movable with respect to each other.

One advantage of the present invention is that it holds a variety of large shell structures, including half-cylinders, cones, and domes of various sizes and is not limited to a single part or type of part.

The present invention also facilitates transportation and storage for the structures and the apparatus itself. Unlike previous holding apparatuses, the present apparatus is small and lightweight while still holding very large parts in optimal orientations for automated inspection.

Another advantage of the present invention is that it requires no support or frame structure that will get in the way of scanning, so the airplane part does not have to be moved multiple times.

It is still another advantage of the present invention that the apparatus is low cost compared to other single part and universal approaches. In other words, one apparatus will work for many different parts, so other apparatuses do not need to be designed, built, and stored.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a complete understanding of the invention, there will now be described some embodiments thereof, given by way of example, reference being made to the accompanying drawings, in which.

FIG. 9 is a perspective view of an apparatus in accordance with another embodiment of the present invention.

FIG. 10 is a perspective view of an apparatus in accordance with another embodiment of the present invention.

FIG. 11 is a perspective view of a pair of apparatus as in FIG. 8.

FIG. 14 is a perspective view of the apparatus of FIG. 13 holding the planar structure of FIG. 13 in a different position.

FIG. 15 is a perspective view of apparatus of FIGS. 13 and 14 illustrating versatility of use with a highly contoured structure.

DETAILED DESCRIPTION

Figure 1:
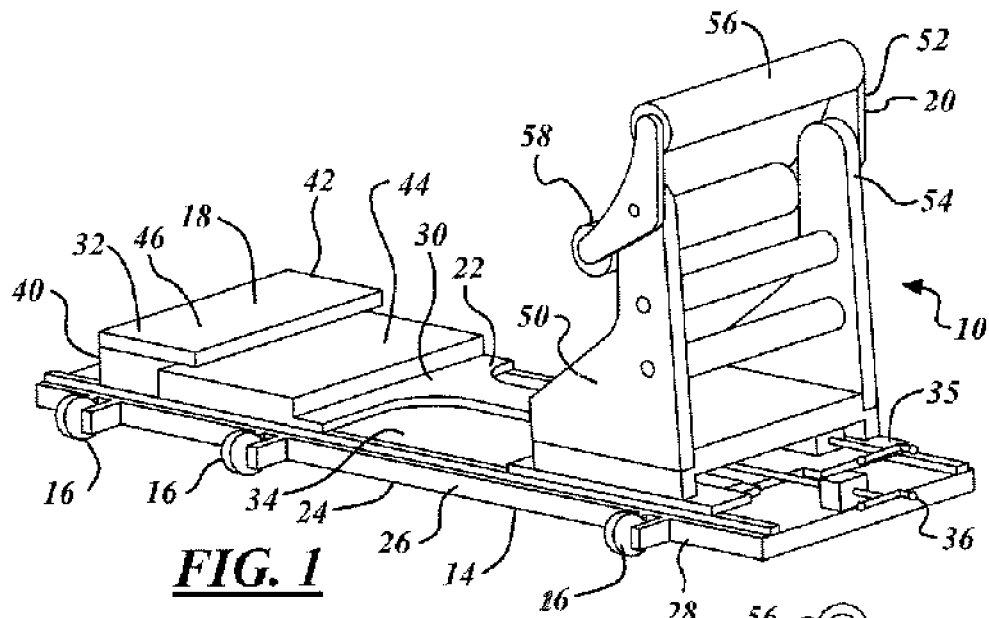
FIG. 1 is a perspective view of an apparatus in accordance with one embodiment of the present invention.
Figure 2:
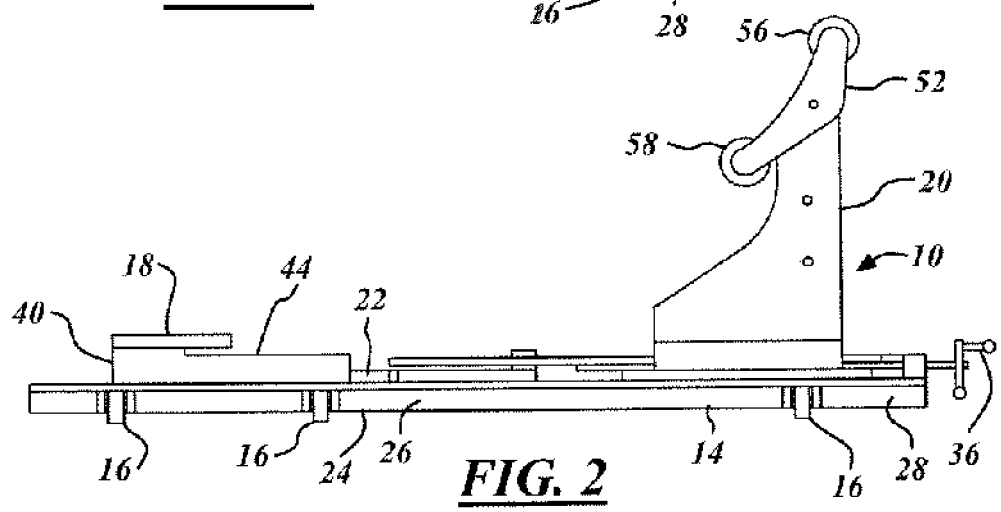
FIG. 2 is a side view of the apparatus of FIG. 1.

The present invention is illustrated with respect to a low cost universal apparatus 10, herein also referred to as a holding apparatus, for holding an aerospace structure that will allow for non-destructive inspection of a variety of large composite shell structures and that is particularly suited to the aerospace field. The present invention is, however, applicable to various other uses that may require holding apparatuses, as will be understood by one skilled in the art. In each of the following figures, the same reference numerals are used to refer to the same components.

Referring to FIGS. 1-4, an apparatus 10 for the holding, inspection, transportation, and storage of large shell aerospace structures 12 is illustrated in accordance with one embodiment of the present invention. The holding apparatus 10 includes a rectangular base 14 or surface having a plurality of wheels 16 coupled thereto. Mounted on the base 14 are an edge support 18 (here embodied as a clip) and a stanchion 20, such that an aerospace structure 12 may be held by the edge support 18 and stanchion 20. The aerospace structure 12 may include any component of an airplane or spacecraft requiring movement, scanning, or transportation, as will be understood by one skilled in the art.

The base 14 includes a top 22, a bottom 24, a common edge 26, a stanchion side 28 (second holder portion) of the top 22, a middle portion 30 of the top 22, and an edge support side 32 (first holder portion) of the top 22. Coupled to the common edge 26 are the plurality of wheels 16, and one skilled in the art would realize that numerous combinations of wheels coupled to various portions of the common edge 26 are included in the present invention. Coupled to the edge support side 32 is the edge support 18, and coupled to the stanchion side 28 is the stanchion 20. At least one of the stanchion 20 or the edge support 18 moves on tracks 34 on the top 22 such that at least one of or both of the edge support 18 and the stanchion 20 are movable with respect to each other.

Generally, movement of the edge support 18 or first holder is controlled by a first crank 35, and movement of the stanchion 20 is controlled by the second crank 36. When a user operates either of the cranks 35, 36, one of the stanchion 20 or the edge support 18 moves along tracks 34 such that an airplane part may be locked in place between the edge support 18 and stanchion 20. Because the edge support 18 and stanchion 20 each rest on linear bearings or tracks 34 and have positions adjustable over a large range, they may provide support for a variety of shaped and sized structures.

Figure 3:
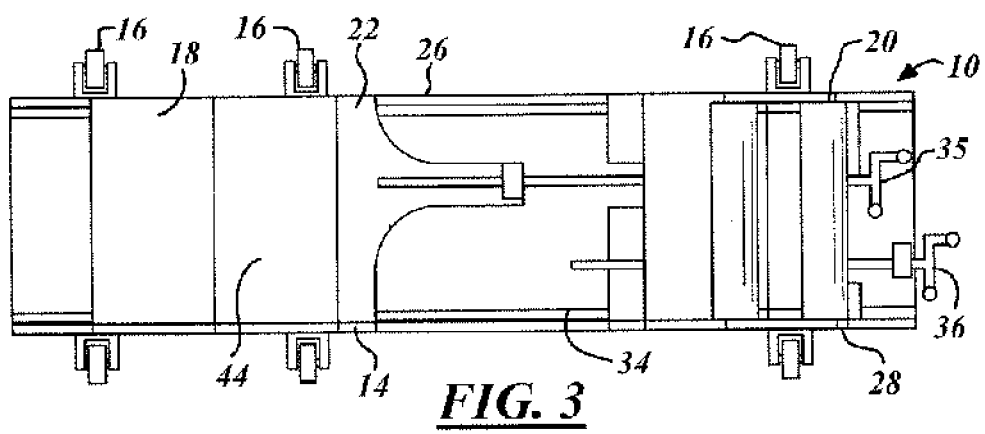
FIG. 3 is a top view of the apparatus of FIG. 1.
Figure 4:
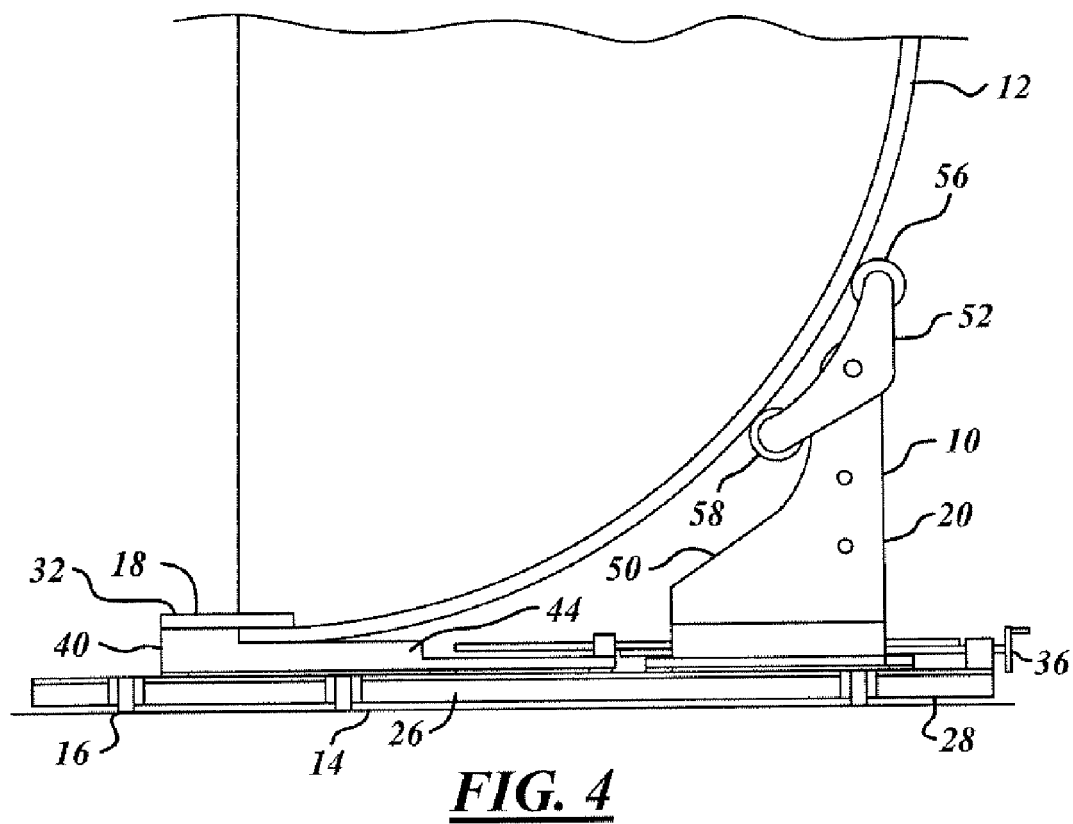
FIG. 4 is a side view of the apparatus of FIG. 1 holding a portion of an airplane.

The edge support 18 is coupled to the top 22 at the edge support side 32 thereof. The edge support 18 includes a stand 40 and a top 42 extending towards the stanchion side 28. The edge support 18 also includes a bottom edge support portion 44, such that a part may be held between the bottom edge support portion 44 and an overhanging portion or overhang 46 of the top 42. In other words, a bottom portion of the part contacts the bottom edge support portion 44 and an upper portion of the part contacts the overhang 46 of the top 42, as illustrated in FIGS. 3 and 4. The edge support 18 releasably engages, is adapted to support, or is adapted to non-fixedly engage the aerospace structure. In other words, the edge support 18 can be anything that holds, clips, stops movement of, or secures the edge of the structure.

The stanchion 20, in accordance with one embodiment of the present invention, is moveably coupled to the top 22 of the base 14 and may be controlled by the crank 36. The stanchion includes a tower 50 and a surface support 52 or second holder coupled to an upper portion 54 thereof. The surface support 52 is either pivotally or fixedly coupled to the tower 50 and is angled with respect to the base 14 for accommodating various airplane parts. The surface support 52 includes an upper roller 56 (first roller) and a lower roller 58 (second roller). The rollers 56, 58 may include a foam material, rubber material, metal material or any other material known in the art, and may roll or be fixedly coupled to the surface support 52.

Figure 5:
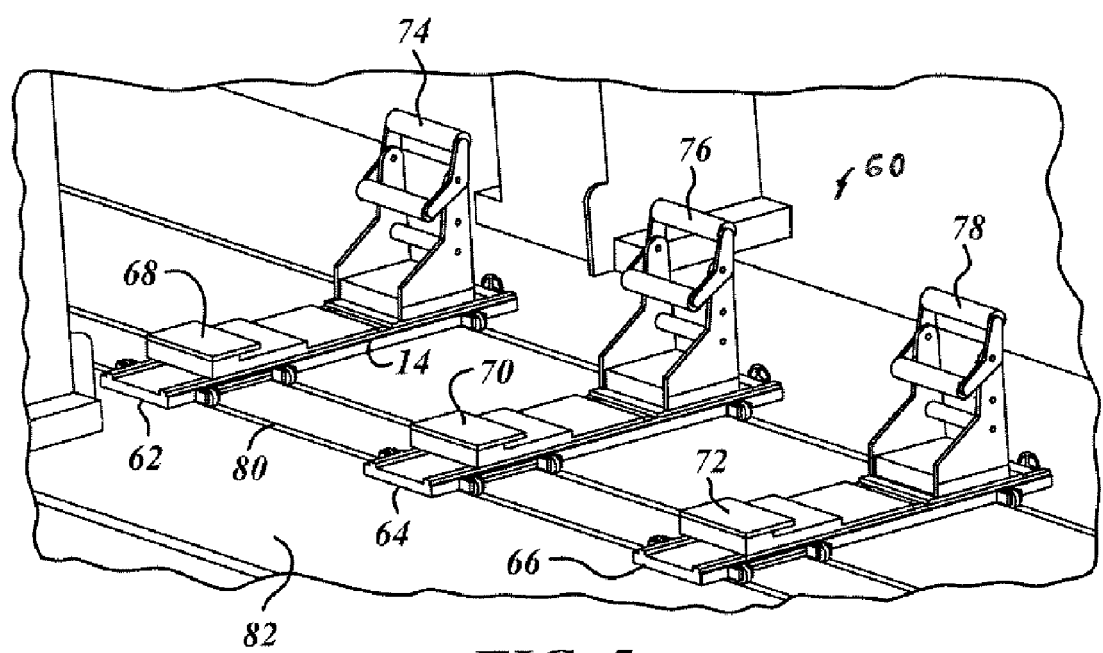
FIG. 5 is a perspective view of a plurality of apparatuses arranged on a track.
Figure 6:
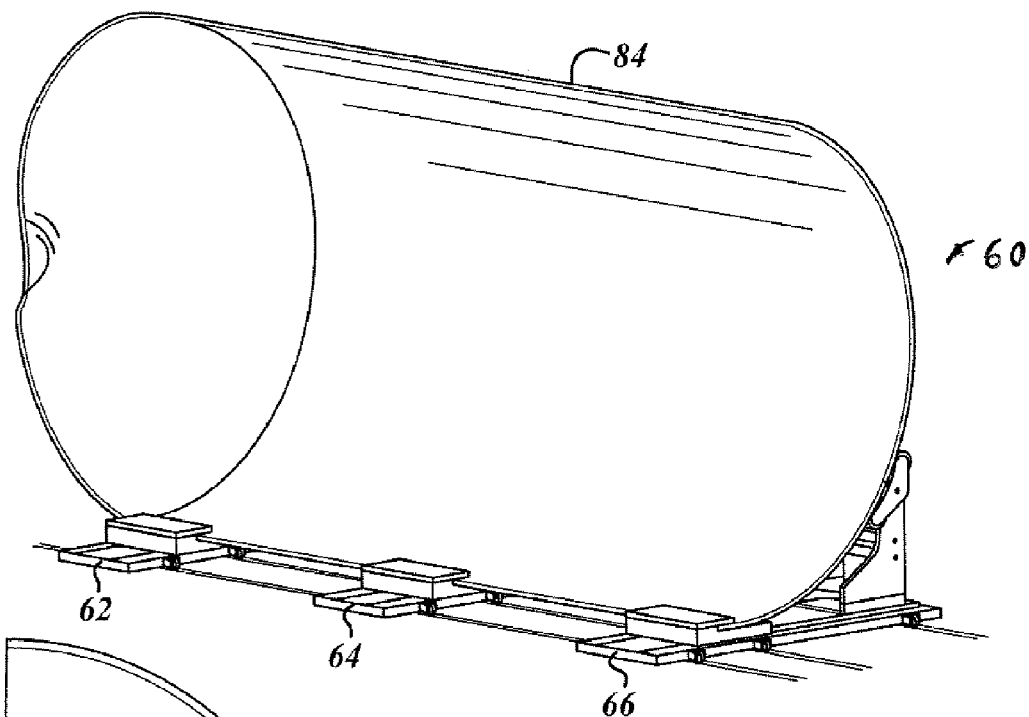
FIG. 6 is a perspective view of the plurality of apparatuses of FIG. 5 holding a portion of an airplane.
Figure 7:
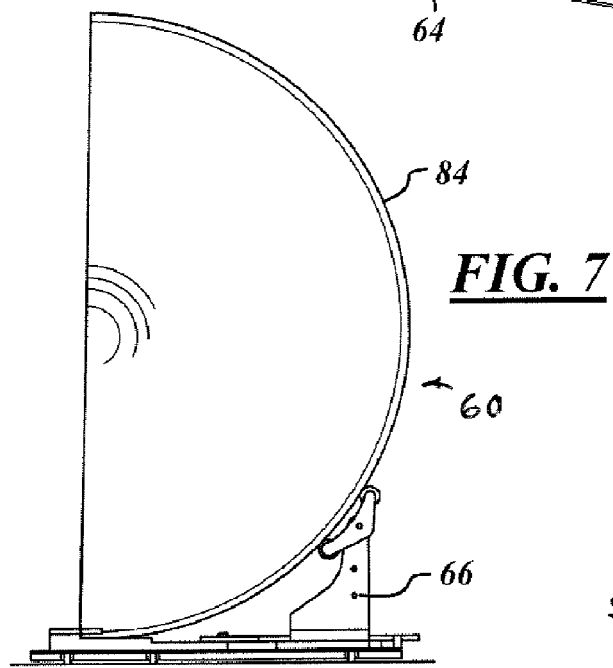
FIG. 7 is a side view of the plurality of apparatuses of FIG. 6.

Referring to FIGS. 5-7, a system 60 for holding an airplane part is illustrated in accordance with another embodiment of the present invention. The system 60 includes plurality of holding apparatuses 62, 64, 66 (first, second, third holding apparatuses respectively) having components similar to the holding apparatuses illustrated in FIGS. 1-4. Each of the holding apparatuses 62, 64, 66 includes an edge support 68, 70, 72 respectively and a stanchion 74, 76, 78 respectively. The apparatuses 62, 64, 66 are positioned on a track 80 along a warehouse floor 82 such that the apparatuses 62, 64, 66 are movable along the track 80 for positioning for optimal support of an airplane part. An airplane part 84 thereby edge supports into the edge support 68, 70, 72 and is supported by the stanchion 74, 76, 78, and any of the stanchions or edge supports 68, 70, 72 may be moved for securing the airplane part 84.

The present invention may include wheels coupled to the holding apparatuses 62, 64, 66 so they can be rolled off the track 80 and onto the warehouse floor surface for moving or storage.

Figure 8:
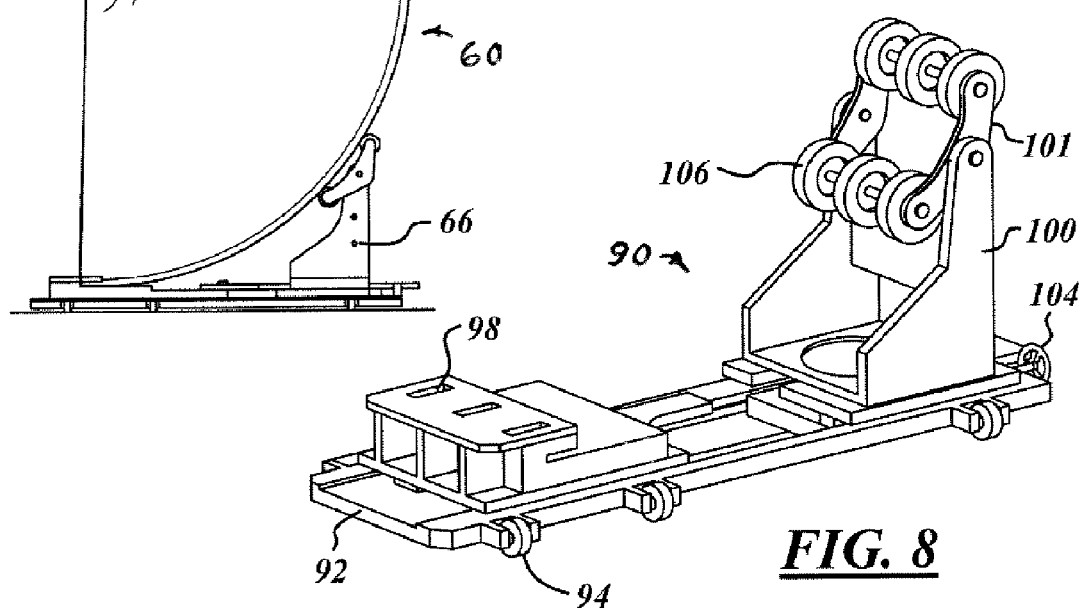
FIG. 8 is a perspective view of an apparatus in accordance with another embodiment of the present invention.

Referring to FIG. 8, a holding apparatus or apparatus for holding 90, in accordance with another embodiment of the present invention, is illustrated. The apparatus for holding 90 includes a base 92 having a plurality of wheels 94 coupled thereto; and coupled to an upper surface 96 thereof is an edge support 98 and a stanchion 100. The stanchion 100 swivels on the base 92 while the edge support 98 is fixed in place. The edge support 98, however, may also move toward the stanchion 100, and the stanchion 100 may also move towards the edge support 98 as a function of control of at least one crank 104 (only one is shown, but multiple cranks may be used) coupled to the base 92. The stanchion 100 includes the plurality of wheels 106 coupled to an upper portion 101 thereof instead of rollers as discussed regarding FIG. 1.

Referring to FIG. 9, an alternate embodiment of the present invention is illustrated including an apparatus 110 holding an airplane part 112. As with the previously discussed holding apparatus, the apparatus 110 includes a base 114, an edge support 116, and a stanchion 118. The stanchion 118 and edge support 116 are moved via cranks 120 for securing the airplane part 112. The stanchion 118 may swivel with respect to the edge support 116 or may be fixed relative thereto. The stanchion 118 includes a tower 119 coupled to the base 114 and a holder 122 having a surface support 124 contacting the airplane part 112. The surface 124 may be flat, tailored to the part 112, or may include a radius of curvature optimal for holding a variety of parts.

Referring to FIG. 10, a holding apparatus 130, in accordance with another embodiment of the present invention, illustrated. The holding apparatus 130 includes a base 132 coupled to a floor frame 134 for positioning the apparatus 130. The apparatus 130 may be on wheels for aiding in positioning and transporting of airplane parts. Unlike the previously discussed embodiments, the holding apparatus 130 includes a flexible belt 136 or strap extending from a first side 138 of the base 132 to a second side 140 of the base 132. The holding apparatus 130 also includes a stanchion 139 such that the belt 136 is higher on the second side 140 than it is on the first side 138. The belt 136 may be tightened by a crank 144 positioned on the stanchion 139. The belts 136 can be adjusted or tightened to hold a wide variety of structures without providing any concentrated loads, which may be harmful to particularly fragile parts.

Figures 12, 13:
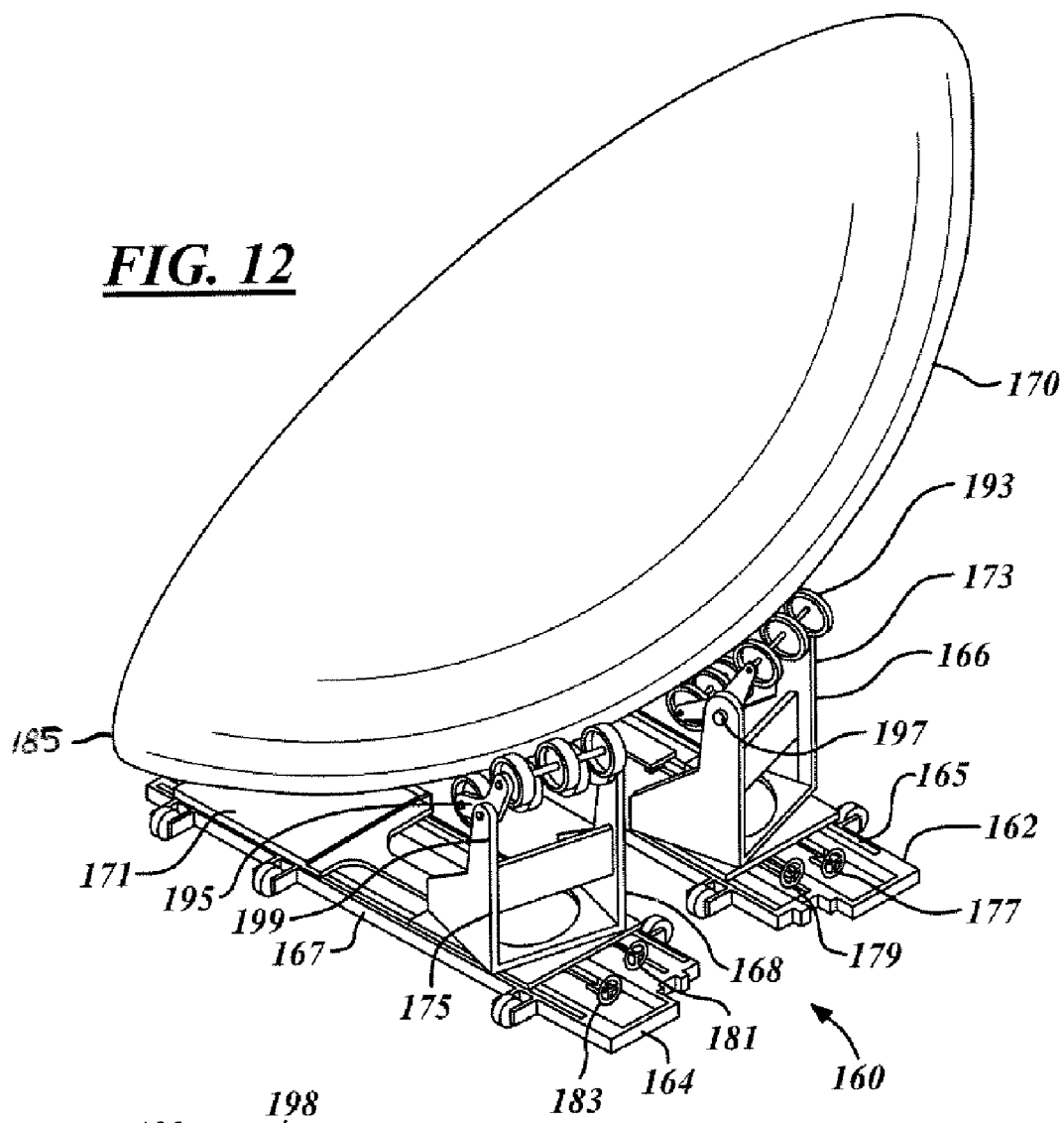
FIG. 12 is a perspective view the apparatus of FIG. 111 holding a portion of an airplane.
FIG. 13 is a perspective view of an apparatus for holding a planar structure in accordance with another embodiment of the present invention.

Referring to FIGS. 11 and 12, an alternate embodiment of the present invention is illustrated including a pair of apparatuses 160. The apparatuses 160 (first holding apparatus 162 and second holding apparatus 164) include pivoting stanchions 166 and 168 such that an airplane component 170 having a spherical surface may be held without requiring a special holding apparatus tailored to the part. Both the first holding apparatus 162 and the second holding apparatus 164 include a base, first base 165 and second base 167, and an edge support stopper, first stopper 169 and second stopper 171, coupled to the base, and a stanchion, first stanchion 173 and second stanchion 175, pivotally coupled to the base. The stanchions 173, 175 each include mounts, first mount 193 and second mount 195, coupled to an upper stanchion portion (upper stanchion portion 197 for the first stanchion 173 and upper stanchion portion 199 for the second stanchion 175).

The stopper 169 and stanchion 173 may move closer to one another through cranks (first crank 177 and second crank 179 for the first holding apparatus 162 and third crank 181 and fourth crank 183 for the second holding apparatus 164), and may move along tracks positioned on the base. Unlike clip edge support discussed regarding previous embodiments, the present stopper edge support generally does not have an overhang, rather it includes a portion extending upward such that spherical surfaces, as illustrated in FIG. 12, may be prevented from sliding off the holding apparatuses and may be supported by the stoppers 169, 171 and the stanchions 173, 175. Important to note is that the stoppers 169, 171 provide weight for preventing roll of the holding apparatuses. They may or may not have an edge support for preventing an edge 185 of the airplane part from sliding out.

Referring to FIGS. 13 through 15, an alternate embodiment of the present invention is illustrated including a pair of holding apparatuses 180, 182. The holding apparatuses 180, 182 include stanchions 184, 186 pivotally coupled to bases 188, 190 and, rather than including wheels or rollers on the stanchions 184, 186, include holding arms 192, 194, which rotate relative to the respective stanchion 184, 186. The arms 192, 194 include clasps 198, 200 for clasping a sheet of airplane material 202. The clasps 198, 200 extend from the arms 192, 194 and may be tightened through a vise arrangement or clamp arrangement, as will be understood as one skilled in the art. The arms 192, 194 may rotate as illustrated in FIG. 14 and may be positioned at any angle relative to the stanchions 184, 186, such that unusually shaped parts 210, as illustrated in FIG. 15, may be held without requiring additional holding apparatuses.

The present invention holds large composite structures in a proper orientation for non-destructive inspection while minimizing floor space requirements and maximizing part or holding apparatus accessibility. Specifically, it can be used to insert, orient, inspect, and remove these parts from a multi-axis ultrasonic inspection scanner. The present invention allows large shell structures to be held in place through an adjustable base. Contact points (foam pad, belt, roller, or wheel assembly) adjust to the curvature of the surface of the airplane parts to provide uniformly loaded support.

From the foregoing, it can be seen that there has been brought to the art a new holding apparatus. It is to be understood that the preceding description of one embodiment of the present invention is merely illustrative of some of the many specific embodiments that represent applications of the principals of the present invention. Numerous and other arrangements would be evident to those skilled in the art without departing from the scope of the invention as defined by the following claims.

What is claimed is:

1. An apparatus for holding an aerospace structure having an edge and a surface, the apparatus comprising:
   a base;
   an edge support coupled to the base and adapted to releasably engage the edge of the structure, said edge support being substantially parallel to said base;
   a stanchion having a first end and a second end, and being movably coupled to said base at said first end, said stanchion being substantially perpendicular to said edge support and said base;
   a surface support movably coupled to said second end of said stanchion and adapted to support the surface of the structure when the edge of the structure is retained by said edge support;
   at least one track for moving at least one of said edge support and said stanchion; and
   a first crank for moving said edge support along said track.

2. The apparatus of claim 1 wherein said edge support is movably mounted to said base.

3. The apparatus of claim 1 wherein said surface support is pivotally mounted to said stanchion.

4. The apparatus of claim 1 wherein said edge support comprises at least one of a clip and a stopper.

5. The apparatus of claim 1 further comprising a second crank for moving said stanchion along said track.

6. The apparatus of claim 1 wherein said surface support comprises an arm rotating on an axis orthogonal to said stanchion.

7. An apparatus for holding an aerospace structure having an edge and a surface, the apparatus comprising:
   a base;
   an edge support coupled to the base and adapted to releasably engage the edge of the structure, said edge support being substantially parallel to said base;
   a stanchion having a first end and a second end, and being movably coupled to said base at said first end, said stanchion being substantially perpendicular to said edge support and said base; and
   a surface support movably coupled to said second end of said stanchion and adapted to support the surface of the structure when the edge of the structure is retained by said edge support, wherein said surface support comprises an arm rotating on an axis orthogonal to said stanchion.

8. The apparatus of claim 7 wherein said edge support is movably mounted to said base.

9. The apparatus of claim 7 wherein said surface support is pivotally mounted to said stanchion.

10. The apparatus of claim 7 wherein said edge support comprises at least one of a clip and a stopper.

11. The apparatus of claim 7 further comprising at least one track for moving at least one of said edge support and said stanchion.

* * * * *